(12) United States Patent
Liang et al.

(10) Patent No.: US 7,834,507 B2
(45) Date of Patent: Nov. 16, 2010

(54) ELECTRIC MACHINE WINDING ARRANGEMENT

(75) Inventors: Feng Liang, Canton, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/434,808

(22) Filed: May 4, 2009

(65) Prior Publication Data

US 2009/0212653 A1 Aug. 27, 2009

Related U.S. Application Data

(62) Division of application No. 11/278,580, filed on Apr. 4, 2006, now Pat. No. 7,545,069.

(51) Int. Cl.
*H02K 19/26* (2006.01)
*H02K 23/02* (2006.01)

(52) U.S. Cl. .................. 310/180; 310/184; 310/179; 310/198

(58) Field of Classification Search ......... 310/179–180, 310/182–184, 198
See application file for complete search history.

(56) References Cited

U.S. PATENT DOCUMENTS

| | | | |
|---|---|---|---|
| 3,385,984 A | 5/1968 | O'Regan | |
| 4,371,802 A | 2/1983 | Morrill | |
| 4,792,709 A | 12/1988 | Smith et al. | |
| 5,194,775 A | 3/1993 | Cooper | |
| 5,212,435 A | 5/1993 | Dutro | |
| 6,075,302 A | 6/2000 | McCleer | |
| 6,114,782 A | 9/2000 | Lin et al. | |
| 6,597,077 B2 | 7/2003 | Lin et al. | |
| 6,700,276 B2 * | 3/2004 | Hakamata | 310/179 |
| 6,969,930 B2 | 11/2005 | Lin et al. | |
| 2005/0073207 A1 * | 4/2005 | Goche | 310/184 |
| 2005/0242671 A1 | 11/2005 | Lin et al. | |

FOREIGN PATENT DOCUMENTS

WO 2006/118298 A1 11/2006

OTHER PUBLICATIONS

Masatoshi Adachi, Hiroatsu Endo, Tsuyoshi Mikami and Katsunori Yagi, Development of a New Hybrid Transmission for RWD Car, Reprinted from Advanced Hybrid Vehicle Powertrains 2006 (SP-2008), SAE Technical Paper Series 2006-01-1339, 2006 SAE World Congress, Detroit, Michigan, Apr. 3-6, 2006, published Apr. 3, 2006.

* cited by examiner

*Primary Examiner*—Quyen Leung
*Assistant Examiner*—Alex W Mok
(74) *Attorney, Agent, or Firm*—David B. Kelley; Brooks Kushman P.C.

(57) ABSTRACT

Rotational electric machine stator winding arrangement characterized, inter alia, by at least one coil of each parallel circuit being discontinuous with the other coils of the corresponding circuit, and by coils configured to accept phase voltage not being adjacent coils having a point at the lowest potential of a corresponding circuit.

15 Claims, 5 Drawing Sheets

ELECTRIC MACHINE WINDING ARRANGEMENT

CROSS-REFERENCE TO RELATED APPLICATION

This application is a divisional of application Ser. No. 11/278,580 filed Apr. 4, 2006, now U.S. Pat. No. 7,545,069.

BACKGROUND OF THE INVENTION

1. Field of the Invention

The present invention relates generally to an electric machine winding arrangement, and in particular to a winding of a rotational electric machine stator.

2. Background Art

Figure 1A:
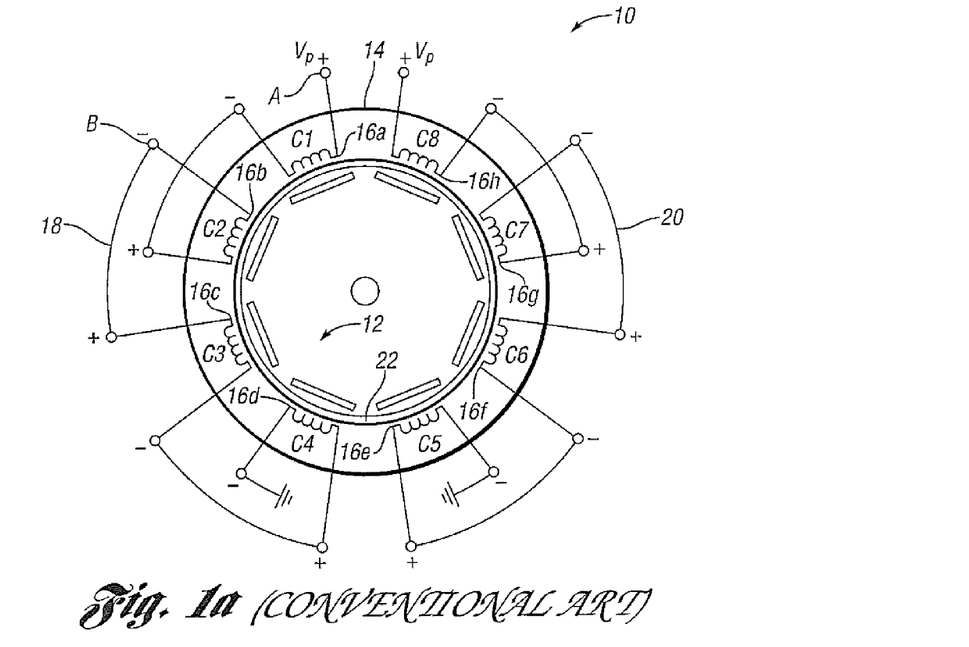

A winding of an electric machine, and in particular a rotational electric machine such as an electric motor and/or generator, is generally formed by connecting the coils of a corresponding stator in a predetermined manner. Referring to FIG. 1(a), a schematic diagram is provided of a conventional rotational electric machine 10 generally referred to as an adjacent pole wound machine. The conventional machine 10 generally comprises a rotor 12, a stator 14, and a plurality of coils 16 (e.g., 16a-16h). In particular, the conventional machine 10 of FIG. 1(a) is an eight-pole electric machine 10 having eight coils 16 (i.e., C1-C8) corresponding to a phase (i.e., the phase voltage Vp) of the eight-pole machine 10. As illustrated, a first group of four adjacent coils 16 (e.g., C1-C4) are electrically coupled in series to form a first circuit 18 and the remaining coils 16 (i.e., a second group of four adjacent coils C8-C5) are electrically coupled in series to form a second circuit 20. The winding (i.e., phase winding) of the adjacent pole wound machine 10 is generally completed by coupling the first 18 and second 20 circuits in parallel. Accordingly, the coils 16 of the first 18 and second 20 circuits generally cooperate to generate a magnetic field for driving the rotor 12.

Figure 1B:
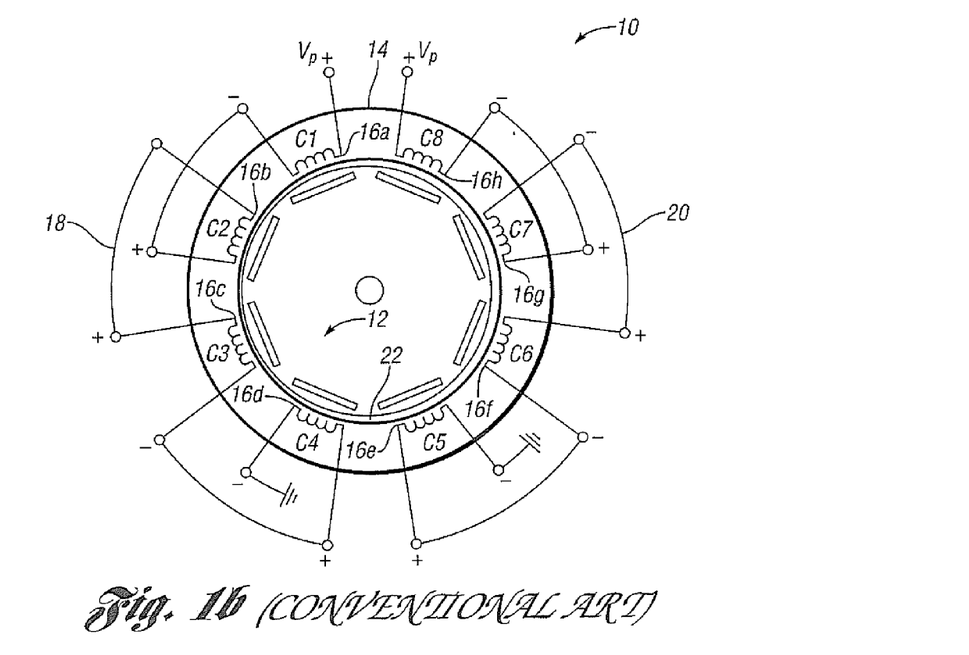

In an ideal electric machine, the air gap 22 between the rotor 12 and the stator 14 is uniform. However, such uniformity may be difficult to achieve in practice. As illustrated in FIG. 1(b), a common cause of non-uniform air gap 22 is the presence of eccentricity in the rotor 12. Such eccentricity may cause the first group of coils 16 (i.e., the coils 16 forming the first circuit 18) to face a smaller air gap 22 than the air gap 22 faced by the second group of coils 16 (i.e., coils forming the second circuit 20) or vice-versa. As a result, the magnetic flux in the air gap 22 faced by, for example, the first group is generally higher than the magnetic flux in the air gap 22 faced by the second group. Such an imbalance in the magnetic flux generally results in imbalanced forces at the stator 12 and rotor 14. The imbalanced forces, in turn, generally increase vibration and noise associated with operation of the machine 10.

Figure 1C:
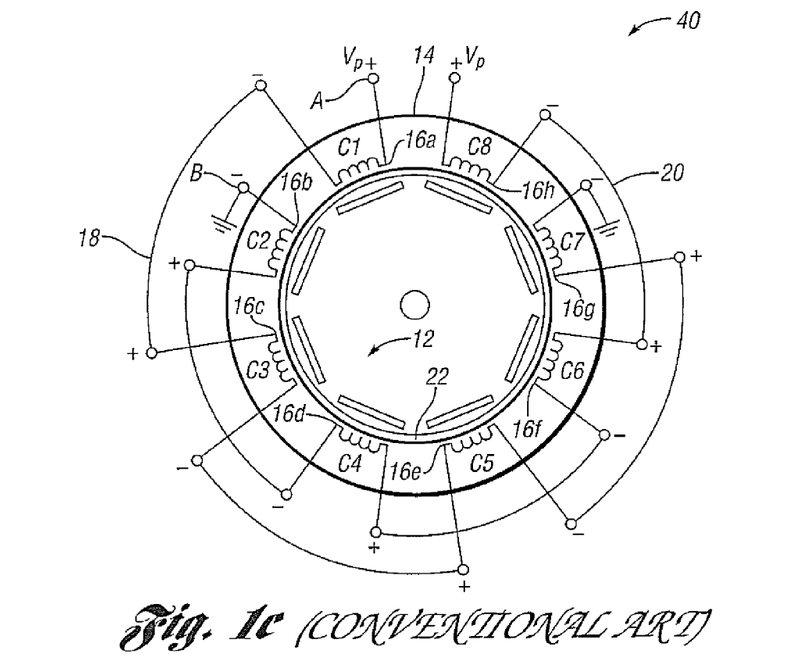

Referring to FIG. 1(c), a schematic diagram is provided of a conventional attempt to address the problems associated with non-uniform air gap 22. As illustrated in FIG. 1(c), an electric machine 40, generally referred to as a skip-pole wound machine, comprises a rotor 12, a stator 14, and a plurality of coils 16 (e.g., 16a-16h). As illustrated, a first group of four non-adjacent coils 16 (e.g., C1, C3, C5 and C7) are electrically coupled in series to form a first circuit 18 and the remaining coils 16 (i.e., a second group of four non-adjacent coils C8, C6, C4 and C2) are electrically coupled in series to form a second circuit 20. The winding (i.e., phase winding) of the skip-pole wound machine 40 is generally completed by coupling the first 18 and second 20 circuits in parallel. As further illustrated in FIG. 1(c), the conventional skip-pole wound machine 40 is additionally characterized by a coil 16 corresponding to a phase voltage (e.g., C1 and/or C8) being adjacent to a coil 16 having a point at the lowest potential of a corresponding circuit (e.g., C2 and/or C7).

Because the conventional skip-pole wound machine 40 generally provides two circuits (i.e., 18 and 20), each having an equal number of coils 16 facing the large and small portions of the air gap 22, imbalance in the forces at the stator 12 and rotor 14 is generally decreased. Accordingly, noise and/or vibration associated with the non-uniform air-gap 22 are generally decreased.

While the conventional skip-pole wound machine 40 may reduce the vibration and/or noise associated with a non-uniform air-gap 22, such a skip-pole arrangement 40 generally increases the maximum possible voltage between two coils 16 at a wire crossing (i.e., point where a segment of a first coil 16 contacts a segment of a second coil 16). For example, assuming that the phase voltage (Vp) is split evenly across the coils 16 in each of the first 18 and second 20 circuits, the conventional adjacent pole wound machine 10 of FIG. 1(a) generally has a maximum wire crossing voltage of 0.5Vp. For instance, if a wire at or near terminal A corresponding to C1 of FIG. 1(a) makes contact with a wire at or near terminal B corresponding to C2, the voltage across the wires at the wire crossing will be substantially equal to 0.5Vp (i.e., Vp−0.5Vp=0.5Vp). Similar analysis shows that the wire crossing voltage between any two adjacent coils 16 of the adjacent pole wound machine 10 cannot exceed 0.5Vp.

In contrast, and still assuming that the phase voltage (Vp) is split evenly across the coils 16 in each of the first 18 and second 20 circuits, the conventional split-pole wound machine 40 of FIG. 1(c) generally has a maximum possible wire crossing voltage of Vp. For example, if a wire at or near terminal A corresponding to C1 of FIG. 1(c) makes contact with a wire at or near terminal B corresponding to C2, the voltage across the wires at the wire crossing will be substantially equal to Vp (i.e., Vp−0=Vp). Accordingly, the wire crossing voltage between two adjacent coils 16 (e.g., C1 and C2) of the split-pole wound machine 40 may equal Vp. Such an increase in the maximum possible wire crossing voltage is generally undesirable as it may produce premature failure of the machine 40.

Accordingly, it may be desirable to have an electric machine having a coil arrangement that reduces the effect of non-uniform air gap while also reducing the maximum possible wire crossing voltage between two adjacent coils of the machine.

SUMMARY OF THE INVENTION

According to the present invention, then, a rotational electric machine stator is provided. The stator comprises a plurality of coils. Each of the coils have a first and second end. The coils are arranged such that a second coil is adjacent a first coil, a third coil is adjacent the second coil, a fourth coil is adjacent the third coil, a fifth coil is adjacent the fourth coil, a sixth coil is adjacent the fifth coil, a seventh coil is adjacent the sixth coil, and an eighth coil is adjacent the seventh and first coils. The first end of each of the first and second coils is configured to receive a phase voltage. The first end of the third coil is coupled to the second end of the first coil, the first end of the fifth coil is coupled to the second end of the third coil, and the first end of the seventh coil is coupled to the second end of the fifth coil such that the first, third, fifth and seventh coils are electrically coupled in series to form a first circuit. The first end of the eighth coil is coupled to the second end of the second coil, the first end of the sixth coil is coupled to the second end of the eighth coil, and the first end of the fourth coil is coupled to the second end of the sixth coil such that the second, eighth, sixth and fourth coils are electrically coupled in series to form a second circuit. The second end of the fourth coil is electrically coupled to the second end of the seventh coil, such that the first and second circuits are electrically coupled in parallel.

Also according to the present invention, a rotational electric machine stator is provided. The stator comprises a plurality of coils. Each of the coils have a first and second end. The coils are arranged such that a second coil is adjacent a first coil, a third coil is adjacent the second coil, a fourth coil is adjacent the third coil, a fifth coil is adjacent the fourth coil, a sixth coil is adjacent the fifth coil, a seventh coil is adjacent the sixth coil, and an eighth coil is adjacent the seventh and first coils. The first end of each of the first and eighth coils is configured to receive a phase voltage. The first end of the second coil is coupled to the second end of the first coil, the first end of the third coil is coupled to the second end of the second coil, and the first end of the fifth coil is coupled to the second end of the third coil such that the first, second, third and fifth coils are electrically coupled in series to form a first circuit. The first end of the seventh coil is coupled to the second end of the eighth coil, the first end of the sixth coil is coupled to the second end of the seventh coil, and the first end of the fourth coil is coupled to the second end of the sixth coil such that the eighth, seventh, sixth and fourth coils are electrically coupled in series to form a second circuit. The second end of the fourth coil is electrically coupled to the second end of the fifth coil, such that the first and second circuits are electrically coupled in parallel.

Also according to the present invention, a rotational electric machine stator is provided. The stator comprises a plurality of coils. Each of the coils have a first and second end. The coils are arranged such that a second coil is adjacent a first coil, a third coil is adjacent the second coil, a fourth coil is adjacent the third coil, a fifth coil is adjacent the fourth coil, a sixth coil is adjacent the fifth coil, a seventh coil is adjacent the sixth coil, and an eighth coil is adjacent the seventh and first coils. The first end of each of the first and eighth coils is configured to receive a phase voltage. The first end of the second coil is coupled to the second end of the first coil, the first end of the third coil is coupled to the second end of the second coil, and the first end of the sixth coil is coupled to the second end of the third coil such that the first, second, third and sixth coils are electrically coupled in series to form a first circuit. The first end of the seventh coil is coupled to the second end of the eighth coil, the first end of the fifth coil is coupled to the second end of the seventh coil, and the first end of the fourth coil is coupled to the second end of the fifth coil such that the eighth, seventh, fifth and fourth coils are electrically coupled in series to form a second circuit. The second end of the fourth coil is electrically coupled to the second end of the sixth coil, such that the first and second circuits are electrically coupled in parallel.

Also according to the present invention, a rotational electric machine stator is provided. The stator comprises a plurality of coils. Each of the coils have a first and second end. The coils are arranged such that a second coil is adjacent a first coil, a third coil is adjacent the second coil, a fourth coil is adjacent the third coil, a fifth coil is adjacent the fourth coil, a sixth coil is adjacent the fifth coil, a seventh coil is adjacent the sixth coil, and an eighth coil is adjacent the seventh and first coils. The first end of each of the first and eighth coils is configured to receive a phase voltage. The first end of the second coil is coupled to the second end of the first coil, the first end of the fourth coil is coupled to the second end of the second coil, and the first end of the sixth coil is coupled to the second end of the fourth coil such that the first, second, fourth and sixth coils are electrically coupled in series to form a first circuit. The first end of the seventh coil is coupled to the second end of the eighth coil, the first end of the fifth coil is coupled to the second end of the seventh coil, and the first end of the third coil is coupled to the second end of the fifth coil such that the eighth, seventh, fifth and third coils are electrically coupled in series to form a second circuit. The second end of the third coil is electrically coupled to the second end of the sixth coil, such that the first and second circuits are electrically coupled in parallel.

Also according to the present invention, a rotational electric machine stator is provided. The stator comprises a plurality of coils. Each of the coils have a first and second end. The coils are arranged such that a second coil is adjacent a first coil, a third coil is adjacent the second coil, a fourth coil is adjacent the third coil, a fifth coil is adjacent the fourth coil, a sixth coil is adjacent the fifth coil, a seventh coil is adjacent the sixth coil, and an eighth coil is adjacent the seventh and first coils. The first end of each of the first and fifth coils is configured to receive a phase voltage. The first end of the second coil is coupled to the second end of the first coil, the first end of the fourth coil is coupled to the second end of the second coil, and the first end of the seventh coil is coupled to the second end of the fourth coil such that the first, second, fourth and seventh coils are electrically coupled in series to form a first circuit. The first end of the sixth coil is coupled to the second end of the fifth coil, the first end of the eighth coil is coupled to the second end of the sixth coil, and the first end of the third coil is coupled to the second end of the eighth coil such that the fifth, sixth, eighth and third coils are electrically coupled in series to form a second circuit. The second end of the third coil is electrically coupled to the second end of the seventh coil, such that the first and second circuits are electrically coupled in parallel.

Also according to the present invention, a rotational electric machine stator is provided. The stator comprises a plurality of coils. Each of the coils have a first and second end. The coils are arranged such that a second coil is adjacent a first coil, a third coil is adjacent the second coil, a fourth coil is adjacent the third coil, a fifth coil is adjacent the fourth coil, a sixth coil is adjacent the fifth coil, a seventh coil is adjacent the sixth coil, and an eighth coil is adjacent the seventh and first coils. The first end of each of the first and fourth coils is configured to receive a phase voltage. The first end of the third coil is coupled to the second end of the first coil, the first end of the fifth coil is coupled to the second end of the third coil, and the first end of the seventh coil is coupled to the second end of the fifth coil such that the first, third, fifth and seventh coils are electrically coupled in series to form a first circuit. The first end of the second coil is coupled to the second end of the fourth coil, the first end of the eighth coil is coupled to the second end of the second coil, and the first end of the sixth coil is coupled to the second end of the eighth coil such that the fourth, second, eighth and sixth coils are electrically coupled in series to form a second circuit. The second end of the sixth coil is electrically coupled to the second end of the seventh coil, such that the first and second circuits are electrically coupled in parallel.

BRIEF DESCRIPTION OF THE DRAWINGS

FIGS. 1(*a-c*) are schematic diagrams of one or more conventional rotational electric machines;

DETAILED DESCRIPTION

With reference to the Figures, wherein like reference numbers indicate like elements, one or more embodiments of the present invention will now be described.

Figure 2:
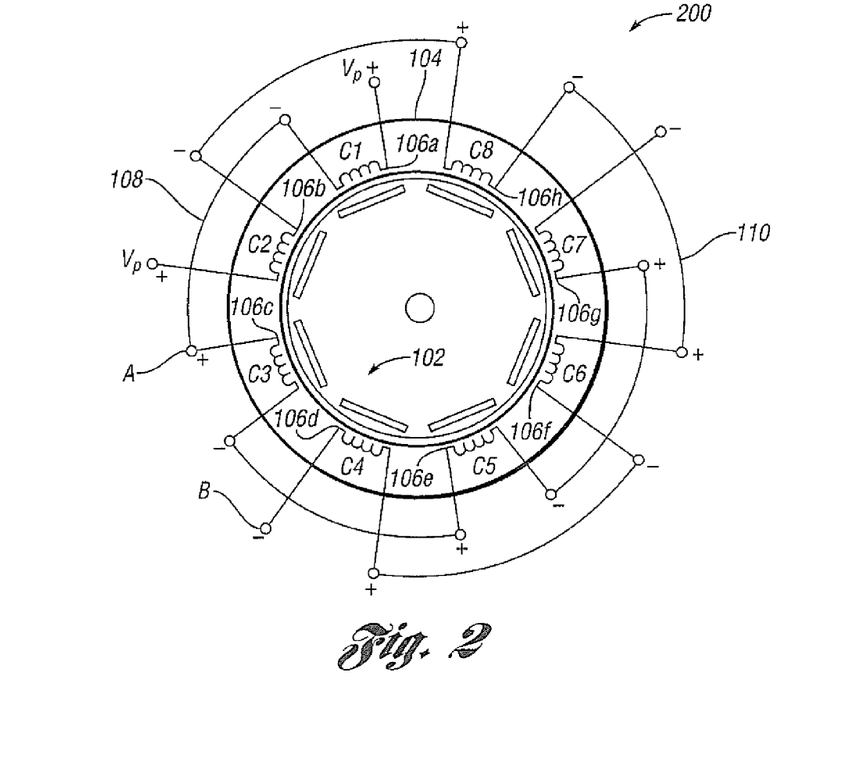
FIG. 2 is a schematic diagram of a rotational electric machine in accordance with an embodiment of the present invention.

Referring to FIG. 2, a schematic diagram is provided of a rotational electric machine 200 in accordance with an embodiment of the present invention. The machine 200 generally comprises a rotor 102 and a stator 104. The stator 104 may include a plurality of coils 106, such as the eight coils 106a-106h. Each of the coils 106 may have a first and second end. As illustrated in FIG. 2, the eight coils 106a-106h may be arranged such that the second coil 106b is adjacent the first coil 106a, the third coil 106c is adjacent the second coil 106b, the fourth coil 106d is adjacent the third coil 106c, the fifth coil 106e is adjacent the fourth coil 106d, the sixth coil 106f is adjacent the fifth coil 106e, the seventh coil 106g is adjacent the sixth coil 106f, and the eighth coil 106h is adjacent both the seventh 106g and first 106a coils.

The first end of each of the first 106a and second 106b coils may be configured to receive a phase voltage (i.e., Vp). Furthermore, the first end of the third coil 106c may be coupled to the second end of the first coil 106a, the first end of the fifth coil 106e may be coupled to the second end of the third coil 106c, and the first end of the seventh coil 106g may be coupled to the second end of the fifth coil 106e such that the first 106a, third 106c, fifth 106e and seventh 106g coils are electrically coupled in series to form a first circuit 108. Similarly, the first end of the eighth coil 106h may be coupled to the second end of the second coil 106b, the first end of the sixth coil 106f may be coupled to the second end of the eighth coil 106h, and the first end of the fourth coil 106d may be coupled to the second end of the sixth coil 106f such that the second 106b, eighth 106h, sixth 106f and fourth 106d coils are electrically coupled in series to form a second circuit 110. The second end of the fourth coil 106d may be electrically coupled to the second end of the seventh coil 106g, such that the first 108 and second 110 circuits are electrically coupled in parallel. In at least one embodiment, the first end of each coil 106 may correspond to a positive reference terminal and/or the second end of each coil 106 may correspond to a negative reference terminal.

Similar to the conventional skip-pole wound machine 40 illustrated in FIG. 1(c), the rotational electric machine 200 of the present invention may reduce, in comparison with the conventional machine 10 illustrated in FIG. 1(a), the vibration and/or noise associated with a non-uniform air-gap 22 due to the increased distribution of the coils 106 of each circuit (i.e., 108 and 110) around the stator 102. However, as illustrated in Table-1 (below), the rotational electric machine 200 generally decreases to 0.75Vp (i.e., seventy-five percent of VP) the maximum possible voltage between two coils 106 at a wire crossing (i.e., a point where a segment of a first coil contacts a segment of a second coil) as compared to the conventional skip-pole wound machine 40 of FIG. 1(c), which, as previously described, has a maximum possible voltage of Vp at a wire crossing.

TABLE 1

| | Coils | | | | | | | |
|---|---|---|---|---|---|---|---|---|
| | 1&2 | 2&3 | 3&4 | 4&5 | 5&6 | 6&7 | 7&8 | 8&1 |
| Max | 0.25 Vp | 0.50 Vp | 0.75 Vp | 0.50 Vp | 0.25 Vp | 0.50 Vp | 0.75 Vp | 0.50 Vp |

For example, assuming that the phase voltage (Vp) is split evenly across the coils 106 in each of the first 108 and second 110 circuits, if a wire at or near terminal A corresponding to C3 makes contact with a wire at or near terminal B corresponding to C4, the voltage across the wires at the wire crossing will be substantially equal to 0.75Vp (i.e., 0.75Vp−0Vp=0.75Vp). Similar analysis shows that the wire crossing voltage between any two adjacent coils 106 of the rotational electric machine 200 generally does not exceed 0.75Vp.

Accordingly, the machine 200 of the present invention generally represents an improvement over the conventional machines 10 and 40.

Figure 3:
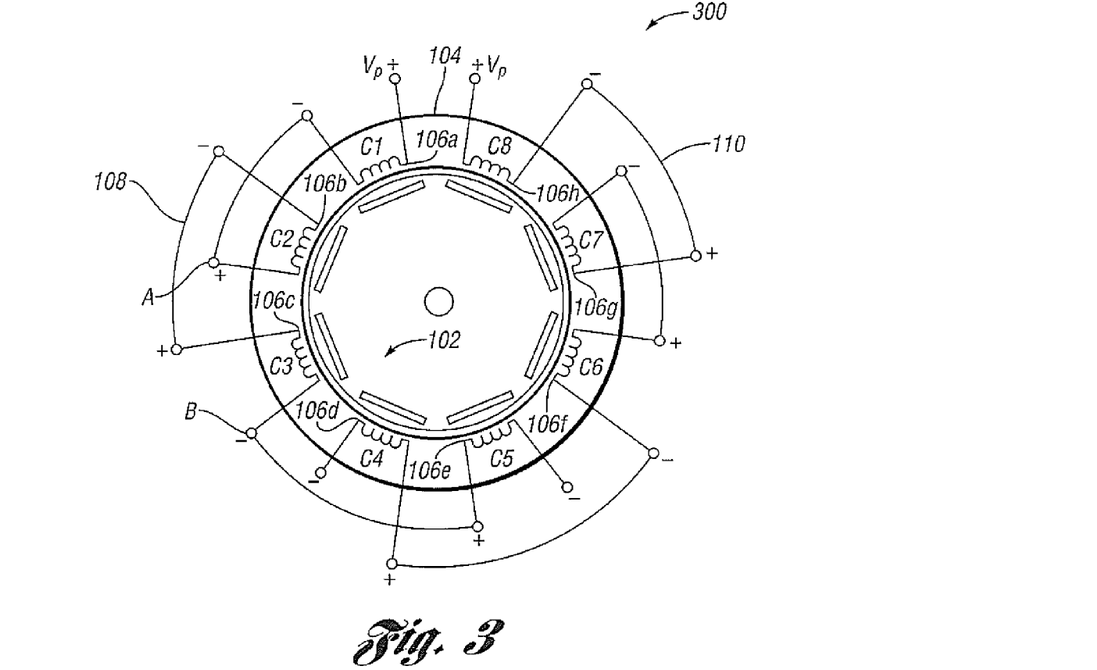
FIG. 3 is a schematic diagram of a rotational electric machine in accordance with another embodiment of the present invention.

Referring to FIG. 3, a schematic diagram is provided of a rotational electric machine 300 in accordance with another embodiment of the present invention. The machine 300 generally comprises a rotor 102 and a stator 104. The stator 104 may include a plurality of coils 106, such as the eight coils 106a-106h. Each of the coils 106 may have a first and second end. As illustrated in FIG. 3, the eight coils 106a-106h may be arranged such that the second coil 106b is adjacent the first coil 106a, the third coil 106c is adjacent the second coil 106b, the fourth coil 106d is adjacent the third coil 106c, the fifth coil 106e is adjacent the fourth coil 106d, the sixth coil 106f is adjacent the fifth coil 106e, the seventh coil 106g is adjacent the sixth coil 106f, and the eighth coil 106h is adjacent both the seventh 106g and first 106a coils.

The first end of each of the first 106a and eighth 106h coils may be configured to receive a phase voltage (i.e., Vp). Furthermore, the first end of the second coil 106b may be coupled to the second end of the first coil 106a, the first end of the third coil 106c may be coupled to the second end of the second coil 106b, and the first end of the fifth coil 106e may be coupled to the second end of the third coil 106c such that the first 106a, second 106b, third 106c and fifth 106e coils are electrically coupled in series to form a first circuit 108. Similarly, the first end of the seventh coil 106g may be coupled to the second end of the eighth coil 106h, the first end of the sixth coil 106f may be coupled to the second end of the seventh coil 106g, and the first end of the fourth coil 106d may be coupled to the second end of the sixth coil 106f such that the eighth 106h, seventh 106g, sixth 106f and fourth 106d coils are electrically coupled in series to form a second circuit 110. The second end of the fourth coil 106d may be electrically coupled to the second end of the fifth coil 106e, such that the first 108 and second 110 circuits are electrically coupled in parallel. In at least one embodiment, the first end of each coil 106 may correspond to a positive reference terminal and/or the second end of each coil 106 may correspond to a negative reference terminal.

Figure 4:
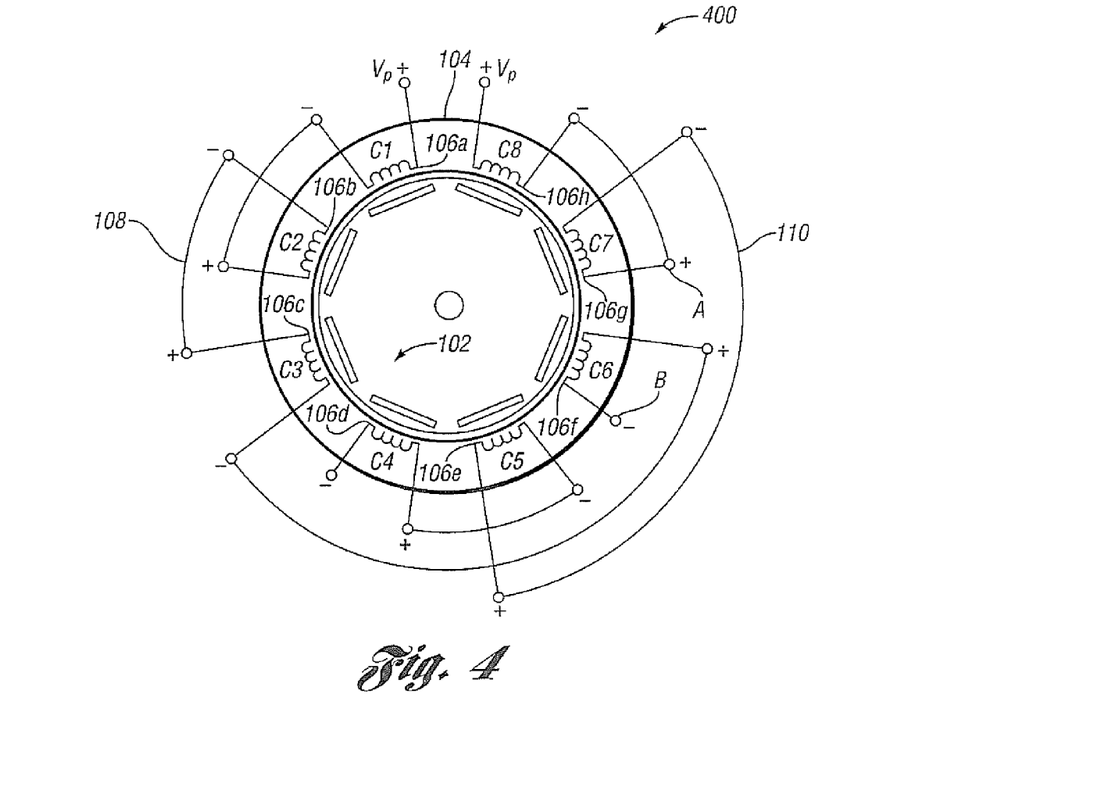
FIG. 4 is a schematic diagram of a rotational electric machine in accordance with another embodiment of the present invention.

Similar to the conventional skip-pole wound machine 40 illustrated in FIG. 1(c), the rotational electric machine 300 of the present invention may reduce, in comparison with the conventional machine 10 illustrated in FIG. 1(a), the vibration and/or noise associated with a non-uniform air-gap 22 due to the increased distribution of the coils 106 of each circuit (i.e., 108 and 110) around the stator 102. However, as illustrated in Table-2 (below), the rotational electric machine 300 generally decreases to 0.50Vp the maximum possible voltage between two coils 106 at a wire crossing as compared to the conventional skip-pole wound machine 40 of FIG. 1(c), which, as previously described, has a maximum possible voltage of Vp at a wire crossing.

is adjacent the fifth coil 106e, the seventh coil 106g is adjacent the sixth coil 106f, and the eighth coil 106h is adjacent both the seventh 106g and first 106a coils.

The first end of each of the first 106a and eighth 106h coils may be configured to receive a phase voltage (i.e., Vp). Furthermore, the first end of the second coil 106b may be coupled to the second end of the first coil 106a, the first end of the third coil 106c may be coupled to the second end of the second coil 106b, and the first end of the sixth coil 106f may be coupled to the second end of the third coil 106c such that the first 106a, second 106b, third 106c and sixth 106f coils are electrically coupled in series to form a first circuit 108. Similarly, the first end of the seventh coil 106g may be coupled to the second end of the eighth coil 106h, the first end of the fifth coil 106e may be coupled to the second end of the seventh coil 106g, and the first end of the fourth coil 106d may be coupled to the second end of the fifth coil 106e such that the eighth 106h, seventh 106g, fifth 106e and fourth 106d coils are electrically coupled in series to form a second circuit 110. The second end of the fourth coil 106d may be electrically coupled to the second end of the sixth coil 106f, such that the first 108 and second 110 circuits are electrically coupled in parallel. In at least one embodiment, the first end of each coil 106 may correspond to

TABLE 2

| | Coils | | | | | | | |
|---|---|---|---|---|---|---|---|---|
| | 1&2 | 2&3 | 3&4 | 4&5 | 5&6 | 6&7 | 7&8 | 8&1 |
| Max | 0.50 Vp | 0.50 Vp | 0.50 Vp | 0.25 Vp | 0.50 Vp | 0.50 Vp | 0.50 Vp | 0.25 Vp |

For example, assuming that the phase voltage (Vp) is split evenly across the coils 106 in each of the first 108 and second 110 circuits, if a wire at or near terminal A corresponding to C2 makes contact with a wire at or near terminal B corresponding to C3, the voltage across the wires at the wire crossing will be substantially equal to 0.50Vp (i.e., 0.75Vp−0.25Vp=0.50Vp). Similar analysis shows that the wire crossing voltage between any two adjacent coils 106 of the rotational electric machine 300 generally does not exceed 0.50Vp.

Accordingly, the machine 300 of the present invention generally represents an improvement over the conventional machines 10 and 40.

Referring to FIG. 4, a schematic diagram is provided of a rotational electric machine 400 in accordance with another embodiment of the present invention. The machine 400 generally comprises a rotor 102 and a stator 104. The stator 104 may include a plurality of coils 106, such as the eight coils 106a-106h. Each of the coils 106 may have a first and second end. As illustrated in FIG. 4, the eight coils 106a-106h may be arranged such that the second coil 106b is adjacent the first coil 106a, the third coil 106c is adjacent the second coil 106b, the fourth coil 106d is adjacent the third coil 106c, the fifth coil 106e is adjacent the fourth coil 106d, the sixth coil 106f a positive reference terminal and/or the second end of each coil 106 may correspond to a negative reference terminal.

Similar to the conventional skip-pole wound machine 40 illustrated in FIG. 1(c), the rotational electric machine 400 of the present invention may reduce, in comparison with the conventional machine 10 illustrated in FIG. 1(a), the vibration and/or noise associated with a non-uniform air-gap 22 due to the increased distribution of the coils 106 of each circuit (i.e., 108 and 110) around the stator 102. However, as illustrated in Table-3 (below), the rotational electric machine 400 generally decreases to 0.75Vp the maximum possible voltage between two coils 106 at a wire crossing as compared to the conventional skip-pole wound machine 40 of FIG. 1(c), which, as previously described, has a maximum possible voltage of Vp at a wire crossing.

TABLE 3

| | Coils | | | | | | | |
|---|---|---|---|---|---|---|---|---|
| | 1&2 | 2&3 | 3&4 | 4&5 | 5&6 | 6&7 | 7&8 | 8&1 |
| Max | 0.50 Vp | 0.50 Vp | 0.50 Vp | 0.50 Vp | 0.50 Vp | 0.75 Vp | 0.50 Vp | 0.25 Vp |

For example, assuming that the phase voltage (Vp) is split evenly across the coils 106 in each of the first 108 and second 110 circuits, if a wire at or near terminal A corresponding to C7 makes contact with a wire at or near terminal B corresponding to C6, the voltage across the wires at the wire crossing will be substantially equal to 0.75Vp (i.e., 0.75Vp−0Vp=0.75Vp). Similar analysis shows that the wire crossing voltage between any two adjacent coils 106 of the rotational electric machine 400 generally does not exceed 0.75Vp.

Accordingly, the machine 400 of the present invention generally represents an improvement over the conventional machines 10 and 40.

Figure 5:
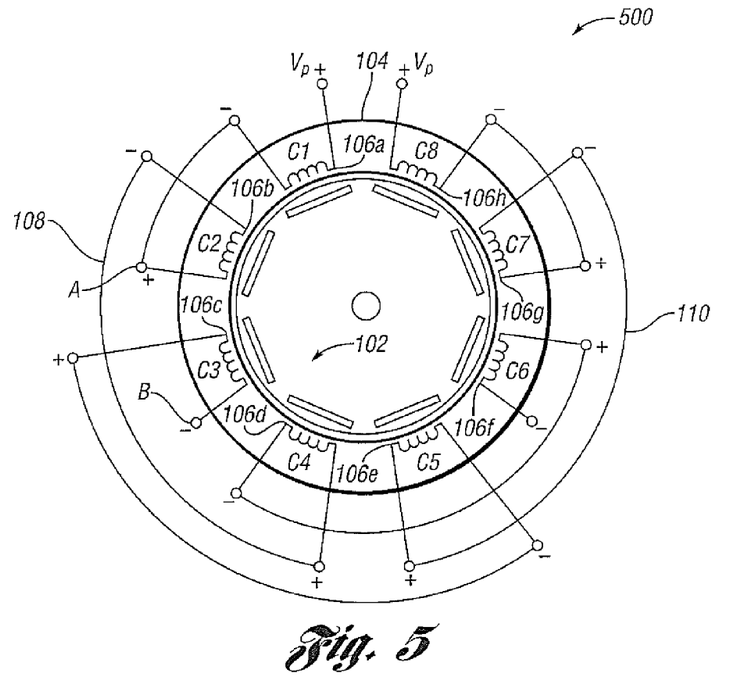
FIG. 5 is a schematic diagram of a rotational electric machine in accordance with another embodiment of the present invention.

Referring to FIG. 5, a schematic diagram is provided of a rotational electric machine 500 in accordance with another embodiment of the present invention. The machine 500 generally comprises a rotor 102 and a stator 104. The stator 104 may include a plurality of coils 106, such as the eight coils 106a-106h. Each of the coils 106 may have a first and second end. As illustrated in FIG. 5, the eight coils 106a-106h may be arranged such that the second coil 106b is adjacent the first coil 106a, the third coil 106c is adjacent the second coil 106b, the fourth coil 106d is adjacent the third coil 106c, the fifth coil 106e is adjacent the fourth coil 106d, the sixth coil 106f is adjacent the fifth coil 106e, the seventh coil 106g is adjacent the sixth coil 106f, and the eighth coil 106h is adjacent both the seventh 106g and first 106a coils.

The first end of each of the first 106a and eighth 106h coils may be configured to receive a phase voltage (i.e., Vp). Furthermore, the first end of the second coil 106b may be coupled to the second end of the first coil 106a, the first end of the fourth coil 106d may be coupled to the second end of the second coil 106b, and the first end of the sixth coil 106f may be coupled to the second end of the fourth coil 106d such that the first 106a, second 106b, fourth 106d and sixth 106f coils are electrically coupled in series to form a first circuit 108. Similarly, the first end of the seventh coil 106g may be coupled to the second end of the eighth coil 106h, the first end of the fifth coil 106e may be coupled to the second end of the seventh coil 106g, and the first end of the third coil 106c may be coupled to the second end of the fifth coil 106e such that the eighth 106h, seventh 106g, fifth 106e and third 106c coils are electrically coupled in series to form a second circuit 110. The second end of the third coil 106c may be electrically coupled to the second end of the sixth coil 106f, such that the first 108 and second 110 circuits are electrically coupled in parallel. In at least one embodiment, the first end of each coil 106 may correspond to a positive reference terminal and/or the second end of each coil 106 may correspond to a negative reference terminal.

Similar to the conventional skip-pole wound machine 40 illustrated in FIG. 1(c), the rotational electric machine 500 of the present invention may reduce, in comparison with the conventional machine 10 illustrated in FIG. 1(a), the vibration and/or noise associated with a non-uniform air-gap 22 due to the increased distribution of the coils 106 of each circuit (i.e., 108 and 110) around the stator 102. However, as illustrated in Table-4 (below), the rotational electric machine 500 generally decreases to 0.75Vp the maximum possible voltage between two coils 106 at a wire crossing as compared to the conventional skip-pole wound machine 40 of FIG. 1(c), which, as previously described, has a maximum possible voltage of Vp at a wire crossing.

For example, assuming that the phase voltage (Vp) is split evenly across the coils 106 in each of the first 108 and second 110 circuits, if a wire at or near terminal A corresponding to C2 makes contact with a wire at or near terminal B corresponding to C3, the voltage across the wires at the wire crossing will be substantially equal to 0.75Vp (i.e., 0.75Vp−0Vp=0.75Vp). Similar analysis shows that the wire crossing voltage between any two adjacent coils 106 of the rotational electric machine 500 generally does not exceed 0.75Vp.

Accordingly, the machine 500 of the present invention generally represents an improvement over the conventional machines 10 and 40.

Figure 6:
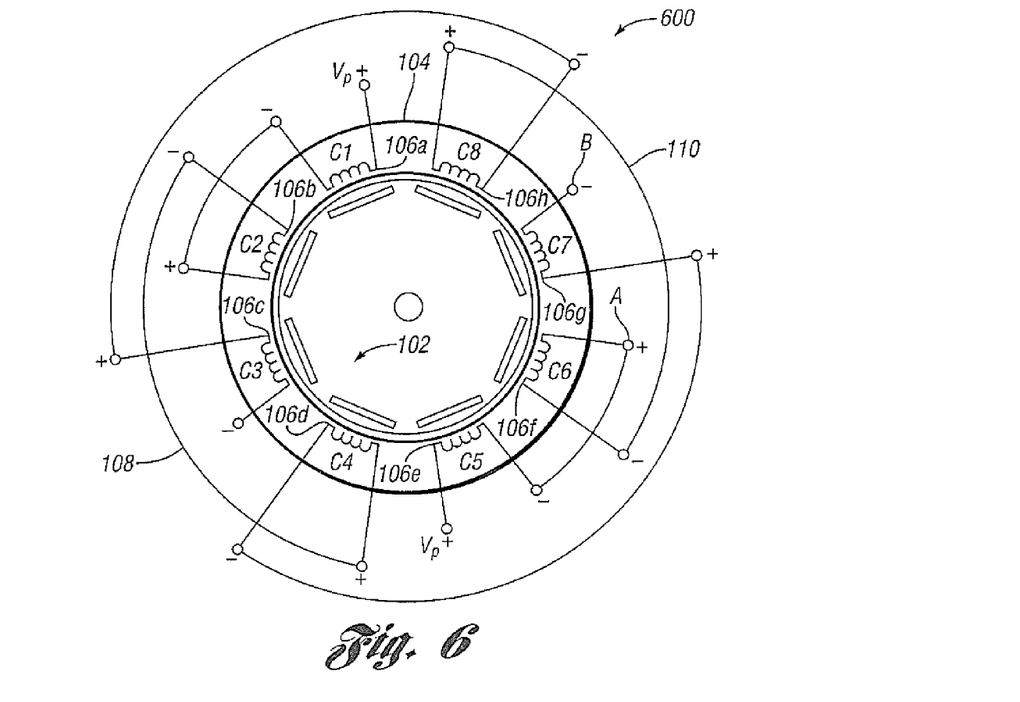
FIG. 6 is a schematic diagram of a rotational electric machine in accordance with another embodiment of the present invention.

Referring to FIG. 6, a schematic diagram is provided of a rotational electric machine 600 in accordance with another embodiment of the present invention. The machine 600 generally comprises a rotor 102 and a stator 104. The stator 104 may include a plurality of coils 106, such as the eight coils 106a-106h. Each of the coils 106 may have a first and second end. As illustrated in FIG. 6, the eight coils 106a-106h may be arranged such that the second coil 106b is adjacent the first coil 106a, the third coil 106c is adjacent the second coil 106b, the fourth coil 106d is adjacent the third coil 106c, the fifth coil 106e is adjacent the fourth coil 106d, the sixth coil 106f is adjacent the fifth coil 106e, the seventh coil 106g is adjacent the sixth coil 106f, and the eighth coil 106h is adjacent both the seventh 106g and first 106a coils.

The first end of each of the first 106a and fifth 106e coils may be configured to receive a phase voltage (i.e., Vp). Furthermore, the first end of the second coil 106b may be coupled to the second end of the first coil 106a, the first end of the fourth coil 106d may be coupled to the second end of the second coil 106b, and the first end of the seventh coil 106g may be coupled to the second end of the fourth coil 106d such that the first 106a, second 106b, fourth 106d and seventh 106g coils are electrically coupled in series to form a first circuit 108. Similarly, the first end of the sixth coil 106f may be coupled to the second end of the fifth coil 106e, the first end of the eighth coil 106h may be coupled to the second end of the sixth coil 106f, and the first end of the third coil 106c may be coupled to the second end of the eighth coil 106h such that the fifth 106e, sixth 106f, eighth 106h and third 106c coils are electrically coupled in series to form a second circuit 110. The second end of the third coil 106c may be electrically coupled to the second end of the seventh coil 106g, such that the first 108 and second 110 circuits are electrically coupled in parallel. In at least one embodiment, the first end of each coil 106 may correspond to a positive reference terminal and/or the second end of each coil 106 may correspond to a negative reference terminal.

Similar to the conventional skip-pole wound machine 40 illustrated in FIG. 1(c), the rotational electric machine 600 of the present invention may reduce, in comparison with the conventional machine 10 illustrated in FIG. 1(a), the vibration and/or noise associated with a non-uniform air-gap 22 due to the increased distribution of the coils 106 of each circuit (i.e., 108 and 110) around the stator 102. However, as illustrated in Table-5 (below), the rotational electric machine 600 generally decreases to 0.75Vp the maximum possible voltage between two coils 106 at a wire crossing as compared to the conventional skip-pole wound machine 40 of FIG. 1(c), which, as previously described, has a maximum possible voltage of Vp at a wire crossing.

TABLE 4

| | Coils | | | | | | | |
|---|---|---|---|---|---|---|---|---|
| | 1&2 | 2&3 | 3&4 | 4&5 | 5&6 | 6&7 | 7&8 | 8&1 |
| Max | 0.50 Vp | 0.75 Vp | 0.50 Vp | 0.25 Vp | 0.50 Vp | 0.75 Vp | 0.50 Vp | 0.25 Vp |

TABLE 5

| | Coils | | | | | | | |
|---|---|---|---|---|---|---|---|---|
| | 1&2 | 2&3 | 3&4 | 4&5 | 5&6 | 6&7 | 7&8 | 8&1 |
| Max | 0.50 Vp | 0.75 Vp | 0.50 Vp | 0.75 Vp | 0.50 Vp | 0.75 Vp | 0.50 Vp | 0.75 Vp |

For example, assuming that the phase voltage (Vp) is split evenly across the coils 106 in each of the first 108 and second 110 circuits, if a wire at or near terminal A corresponding to C6 makes contact with a wire at or near terminal B corresponding to C7, the voltage across the wires at the wire crossing will be substantially equal to 0.75Vp (i.e., 0.75Vp−0Vp=0.75Vp). Similar analysis shows that the wire crossing voltage between any two adjacent coils 106 of the rotational electric machine 600 generally does not exceed 0.75Vp.

Accordingly, the machine 600 of the present invention generally represents an improvement over the conventional machines 10 and 40.

Figure 7:
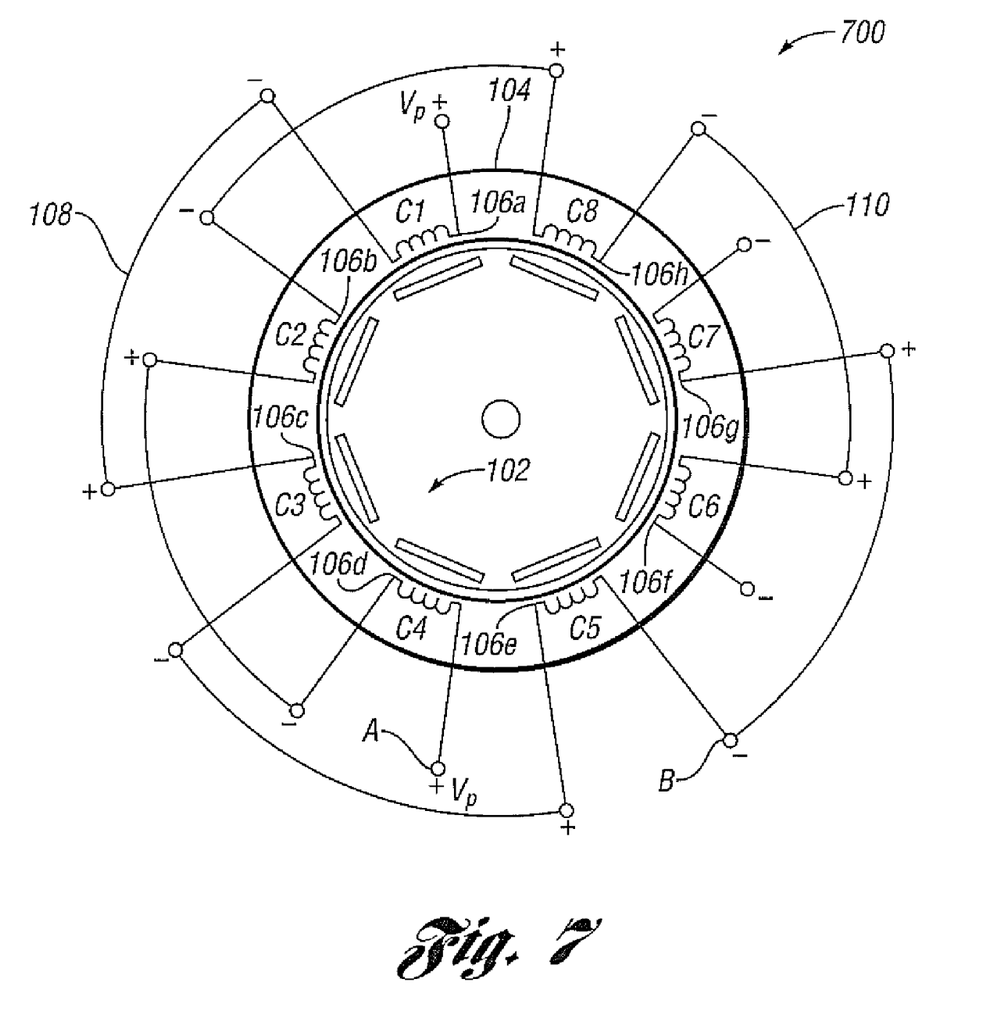
FIG. 7 is a schematic diagram of a rotational electric machine in accordance with another embodiment of the present invention.

Referring to FIG. 7, a schematic diagram is provided of a rotational electric machine 700 in accordance with another embodiment of the present invention. The machine 700 generally comprises a rotor 102 and a stator 104. The stator 104 may include a plurality of coils 106, such as the eight coils 106a-106h. Each of the coils 106 may have a first and second end. As illustrated in FIG. 7, the eight coils 106a-106h may be arranged such that the second coil 106b is adjacent the first coil 106a, the third coil 106c is adjacent the second coil 106b, the fourth coil 106d is adjacent the third coil 106c, the fifth coil 106e is adjacent the fourth coil 106d, the sixth coil 106f is adjacent the fifth coil 106e, the seventh coil 106g is adjacent the sixth coil 106f, and the eighth coil 106h is adjacent both the seventh 106g and first 106a coils.

The first end of each of the first 106a and fourth 106d coils may be configured to receive a phase voltage (i.e., Vp). Furthermore, the first end of the third coil 106c may be coupled to the second end of the first coil 106a, the first end of the fifth coil 106e may be coupled to the second end of the third coil 106c, and the first end of the seventh coil 106g may be coupled to the second end of the fifth coil 106e such that the first 106a, third 106c, fifth 106e and seventh 106g coils are electrically coupled in series to form a first circuit 108. Similarly, the first end of the second coil 106b may be coupled to the second end of the fourth coil 106d, the first end of the eighth coil 106h may be coupled to the second end of the second coil 106b, and the first end of the sixth coil 106f may be coupled to the second end of the eighth coil 106h such that the fourth 106d, second 106b, eighth 106h and sixth 106f coils are electrically coupled in series to form a second circuit 110. The second end of the sixth coil 106f may be electrically coupled to the second end of the seventh coil 106g, such that the first 108 and second 110 circuits are electrically coupled in parallel. In at least one embodiment, the first end of each coil 106 may correspond to a positive reference terminal and/or the second end of each coil 106 may correspond to a negative reference terminal.

Similar to the conventional skip-pole wound machine 40 illustrated in FIG. 1(c), the rotational electric machine 700 of the present invention may reduce, in comparison with the conventional machine 10 illustrated in FIG. 1(a), the vibration and/or noise associated with a non-uniform air-gap 22 due to the increased distribution of the coils 106 of each circuit (i.e., 108 and 110) around the stator 102. However, as illustrated in Table-6 (below), the rotational electric machine 700 generally decreases to 0.75Vp the maximum possible voltage between two coils 106 at a wire crossing as compared to the conventional skip-pole wound machine 40 of FIG. 1(c), which, as previously described, has a maximum possible voltage of Vp at a wire crossing.

TABLE 6

| | Coils | | | | | | | |
|---|---|---|---|---|---|---|---|---|
| | 1&2 | 2&3 | 3&4 | 4&5 | 5&6 | 6&7 | 7&8 | 8&1 |
| Max | 0.50 Vp | 0.25 Vp | 0.50 Vp | 0.75 Vp | 0.50 Vp | 0.25 Vp | 0.50 Vp | 0.75 Vp |

For example, assuming that the phase voltage (Vp) is split evenly across the coils 106 in each of the first 108 and second 110 circuits, if a wire at or near terminal A corresponding to C4 makes contact with a wire at or near terminal B corresponding to C5, the voltage across the wires at the wire crossing will be substantially equal to 0.75Vp (i.e., Vp−0.25Vp=0.75Vp). Similar analysis shows that the wire crossing voltage between any two adjacent coils 106 of the rotational electric machine 700 generally does not exceed 0.75Vp.

Accordingly, the machine 700 of the present invention generally represents an improvement over the conventional machines 10 and 40.

In general, one or more embodiments of the present invention may be characterized, inter alia, by at least one coil 106 of each circuit (e.g., 108, 110) being discontinuous with other coils 106 of the corresponding circuit, and by coils 106 configured to accept phase voltage (i.e., Vp) not being adjacent coils 106 having a point at the lowest potential of a corresponding circuit.

It should be noted that the present invention may be equally applicable to multi-phase electric machines, wherein each of the phase windings are formed in accordance with an embodiment of the present invention. Furthermore, any appropriate number of coils 106 may be implemented to satisfy the design requirements of a particular application.

Accordingly, one or more embodiment of the present invention may reduce the vibration and/or noise associated with a non-uniform air-gap 22 while decreasing the maximum possible voltage between two coils 106 at a wire crossing.

While the best mode for carrying out the invention has been described in detail, those familiar with the art to which this invention relates will recognize various alternative designs and embodiments for practicing the invention as defined by the following claims.

What is claimed:

1. A rotational electric machine stator comprising:
a plurality of coils divided into a first circuit and a second circuit, the coils within each circuit connected to one another in series and the first and second circuits connected to one another in parallel, both the first circuit and the second circuit having a beginning coil and an ending coil across which a phase voltage ($V_p$) is applied;
wherein at least one series connection in each of the first and second circuits is between non-adjacent coils, and the beginning coil and the ending coil at each circuit are selected so that a maximum voltage across any two contacting adjacent conductors is at most approximately $0.75V_p$.

2. The rotational electric machine stator of claim 1 wherein each of the plurality of coils includes a first end corresponding to a positive reference terminal.

3. The rotational electric machine stator of claim 1 wherein each of the plurality of coils includes a second end corresponding to a negative reference terminal.

4. The rotational electric machine stator of claim 1 wherein the plurality of coils includes one coil for each pole of the electric machine stator.

5. The rotational electric machine stator of claim 4 further comprising multiple stator slots wherein the plurality of coils are inserted into the stator slots.

6. The rotational electric machine stator of claim 4 wherein the plurality of coils are divided in half to form the first circuit and the second circuit.

7. The rotational electric machine stator of claim 1 wherein the plurality of coils comprises:
a first coil having a first and second end;
a second coil having a first and second end, the second coil adjacent the first coil;
a third coil having a first and second end, the third coil adjacent the second coil;
a fourth coil having a first and second end, the fourth coil adjacent the third coil;
a fifth coil having a first and second end, the fifth coil adjacent the fourth coil;
a sixth coil having a first and second end, the sixth coil adjacent the fifth coil;
a seventh coil having a first and second end, the seventh coil adjacent the sixth coil; and
an eighth coil having a first and second end, the eighth coil adjacent the seventh and first coils, wherein
the first end of each of the first and eighth coils is configured to receive the phase voltage;
the first end of the second coil is coupled to the second end of the first coil, the first end of the third coil is coupled to the second end of the second coil, and the first end of the fifth coil is coupled to the second end of the third coil such that the first, second, third and fifth coils are electrically coupled in series to form the first circuit;
the first end of the seventh coil is coupled to the second end of the eighth coil, the first end of the sixth coil is coupled to the second end of the seventh coil, and the first end of the fourth coil is coupled to the second end of the sixth coil such that the eighth, seventh, sixth and fourth coils are electrically coupled in series to form the second circuit; and
the second end of the fourth coil is electrically coupled to the second end of the fifth coil, such that the first and second circuits are electrically coupled in parallel.

8. The rotational electric machine stator of claim 1 wherein the plurality of coils comprises:
a first coil having a first and second end;
a second coil having a first and second end, the second coil adjacent the first coil;
a third coil having a first and second end, the third coil adjacent the second coil;
a fourth coil having a first and second end, the fourth coil adjacent the third coil;
a fifth coil having a first and second end, the fifth coil adjacent the fourth coil;
a sixth coil having a first and second end, the sixth coil adjacent the fifth coil;
a seventh coil having a first and second end, the seventh coil adjacent the sixth coil; and
an eighth coil having a first and second end, the eighth coil adjacent the seventh and first coils, wherein
the first end of each of the first and eighth coils is configured to receive the phase voltage;
the first end of the second coil is coupled to the second end of the first coil, the first end of the third coil is coupled to the second end of the second coil, and the first end of the sixth coil is coupled to the second end of the third coil such that the first, second, third and sixth coils are electrically coupled in series to form the first circuit;
the first end of the seventh coil is coupled to the second end of the eighth coil, the first end of the fifth coil is coupled to the second end of the seventh coil, and the first end of the fourth coil is coupled to the second end of the fifth coil such that the eighth, seventh, fifth and fourth coils are electrically coupled in series to form the second circuit; and
the second end of the fourth coil is electrically coupled to the second end of the sixth coil, such that the first and second circuits are electrically coupled in parallel.

9. The rotational electric machine stator of claim 1 wherein the plurality of coils comprises:
a first coil having a first and second end;
a second coil having a first and second end, the second coil adjacent the first coil;
a third coil having a first and second end, the third coil adjacent the second coil;
a fourth coil having a first and second end, the fourth coil adjacent the third coil;
a fifth coil having a first and second end, the fifth coil adjacent the fourth coil;
a sixth coil having a first and second end, the sixth coil adjacent the fifth coil;
a seventh coil having a first and second end, the seventh coil adjacent the sixth coil; and
an eighth coil having a first and second end, the eighth coil adjacent the seventh and first coils, wherein
the first end of each of the first and fifth coils is configured to receive the phase voltage;
the first end of the second coil is coupled to the second end of the first coil, the first end of the fourth coil is coupled to the second end of the second coil, and the first end of the seventh coil is coupled to the second end of the fourth coil such that the first, second, fourth and seventh coils are electrically coupled in series to form the first circuit;
the first end of the sixth coil is coupled to the second end of the fifth coil, the first end of the eighth coil is coupled to the second end of the sixth coil, and the first end of the third coil is coupled to the second end of the eighth coil such that the fifth, sixth, eighth and third coils are electrically coupled in series to form the second circuit; and the second end of the third coil is electrically coupled to the second end of the seventh coil, such that the first and second circuits are electrically coupled in parallel.

10. A rotational electric machine stator comprising:

a first coil having a first and second end;

a second coil having a first and second end, the second coil adjacent the first coil;

a third coil having a first and second end, the third coil adjacent the second coil;

a fourth coil having a first and second end, the fourth coil adjacent the third coil;

a fifth coil having a first and second end, the fifth coil adjacent the fourth coil;

a sixth coil having a first and second end, the sixth coil adjacent the fifth coil;

a seventh coil having a first and second end, the seventh coil adjacent the sixth coil; and an eighth coil having a first and second end, the eighth coil adjacent the seventh and first coils, wherein the first end of each of the first and fourth coils is configured to receive a phase voltage;

the first end of the third coil is coupled to the second end of the first coil, the first end of the fifth coil is coupled to the second end of the third coil, and the first end of the seventh coil is coupled to the second end of the fifth coil such that the first, third, fifth and seventh coils are electrically coupled in series to form a first circuit;

the first end of the second coil is coupled to the second end of the fourth coil, the first end of the eighth coil is coupled to the second end of the second coil, and the first end of the sixth coil is coupled to the second end of the eighth coil such that the fourth, second, eighth and sixth coils are electrically coupled in series to form a second circuit; and the second end of the sixth coil is electrically coupled to the second end of the seventh coil, such that the first and second circuits are electrically coupled in parallel.

11. The rotational electric machine stator of claim 10 wherein each of the first ends correspond to a positive reference terminal of a corresponding coil.

12. The rotational electric machine stator of claim 10 wherein each of the second ends correspond to a negative reference terminal of a corresponding coil.

13. The rotational electric machine stator of claim 1, wherein the plurality of coils comprises:

a first coil having a first and second end;

a second coil having a first and second end, the second coil adjacent the first coil;

a third coil having a first and second end, the third coil adjacent the second coil;

a fourth coil having a first and second end, the fourth coil adjacent the third coil;

a fifth coil having a first and second end, the fifth coil adjacent the fourth coil;

a sixth coil having a first and second end, the sixth coil adjacent the fifth coil;

a seventh coil having a first and second end, the seventh coil adjacent the sixth coil; and an eighth coil having a first and second end, the eighth coil adjacent the seventh and first coils, wherein the first end of each of the first and eighth coils is configured to receive a phase voltage;

the first end of the second coil is coupled to the second end of the first coil, the first end of the fourth coil is coupled to the second end of the second coil, and the first end of the sixth coil is coupled to the second end of the fourth coil such that the first, second, fourth and sixth coils are electrically coupled in series to form the first circuit;

the first end of the seventh coil is coupled to the second end of the eighth coil, the first end of the fifth coil is coupled to the second end of the seventh coil, and the first end of the third coil is coupled to the second end of the fifth coil such that the eighth, seventh, fifth and third coils are electrically coupled in series to form the second circuit; and the second end of the third coil is electrically coupled to the second end of the sixth coil, such that the first and second circuits are electrically coupled in parallel.

14. The rotational electric machine stator of claim 13 wherein each of the first ends correspond to a positive reference terminal of a corresponding coil.

15. The rotational electric machine stator of claim 13 wherein each of the second ends correspond to a negative reference terminal of a corresponding coil.

* * * * *